H. COX.
Side-Hill Plow.
No. 5,909.
Patented Nov. 7, 1848.
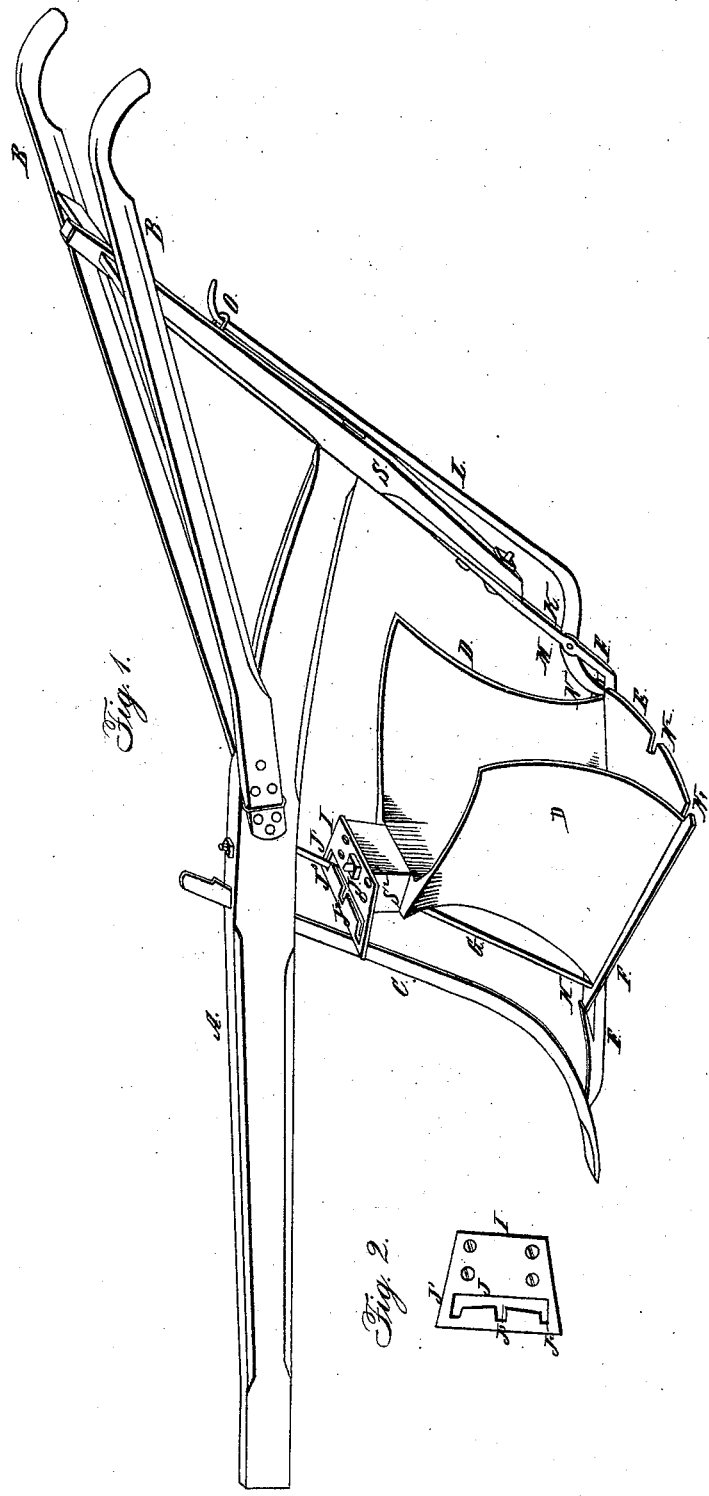

UNITED STATES PATENT OFFICE.

HAYWOOD COX, OF PEACH BOTTOM, VIRGINIA.

IMPROVEMENT IN HILLSIDE-PLOWS.

Specification forming part of Letters Patent No. 5,909, dated November 7, 1848.

*To all whom it may concern:*

Be it known that I, HAYWOOD COX, of Peach Bottom, in the county of Grayson and State of Virginia, have invented a new and useful Improvement in Hillside-Plows, which is described as follows, reference being had to the annexed drawings of the same, making part of this specification.

Figure 1 is a perspective view of the plow. Fig. 2 is a top view of the horizontal plate containing the E-shaped slot.

This improvement consists in securing a double mold-board plow to the forward and back part of the land-bar at its lower part and to an inclined rod extending from near the point of the land-bar to the beam at its upper forward part in such a manner that the back and upper parts of said plow can be thrown on either side and secured there, in order to form a right or left hand plow to throw the furrow either way, or can be secured immediately below the beam to form a cultivator-plow.

The beam A, handles B, and cutter or colter C, and double mold-board plow D are made in the usual or most approved manner, and need not therefore be particularly described.

E is a triangular share, secured on the under part of the plow by suitable bolts.

F is the land-bar attached to the colter at its forward end, and bent upward at its opposite end at an angle of about sixty degrees, and bolted at this end to an inclined timber or sheth, S, secured to the cross-bar of the handles and the rear end of the beam on the same line of inclination as the bent end of the land-bar.

G is an inclined rod, secured to the land-bar near its point and extending up through the beam, and secured to the same by a nut and screw.

H is an aperture in the share near its forward point, through which the inclined rod passes.

I is a horizontal plate, of the form of a trapezium or any desired form, secured to the top of the plow by bolts or otherwise, and projecting beyond the front of the same.

J is a slot or opening in the plate I, of the form of the letter E, as represented in Fig. 2, through which the inclined rod passes.

K is a slot in the inclined part of the land-bar, through which the curved end of a lever passes.

L is a lever or dog, bent at its lower end in the form of an S.

M is a pin passing through the bar and lever, on which the lever moves as a fulcrum.

N are apertures formed in the triangular share, near its rear curved edge, at equal distances apart, one being in the center and the other two near the inclined edges of the share, in which the lower end of the curved lever is inserted for holding the plow on either side or immediately under the beam.

O is a hook on the inclined timber, in which the upper end of the lever is placed, for holding the lower end of said lever in the openings in the share.

It will be readily perceived from the foregoing description that the plow can be changed from a left-hand plow (as it is represented in the drawings) to a right-hand one by simply detaching the upper end of the lever or dog L from the hook O and turning the lever on its fulcrum, so as to draw the lower end of the same out of the opening N in the share E at the right-hand side of the share and detaching the right-hand notch J in the plate I from the inclined rod G and turning the plow to the right on said inclined rod, so as to cause the inclined rod to enter the left-hand notch $J^2$, formed by the E-shaped opening in the plate I, and to bring the opening N near the left angle of the share immediately under the lower end of the lever or dog, which is forced into the same by raising the upper end of the lever and inserting it in the hook for holding the plow firmly in its place.

The plow may be converted into a cultivator-plow in like manner by inserting the inclined rod into the center notch, $J^3$, of the plate I and the lower end of the lever or dog into the center opening, $N^2$, in the share.

What I claim as my invention, and desire to secure by Letters Patent, is—

The employment of a horizontal plate, I, perforated with an opening made in the form of the letter E, and fixed to the head of the standard $S^2$, in combination with the perforated triangular plate E and curved dog L, or lever, and inclined rod G, on which the double mold-board D and landside turn, by which the plow is alternately changed from a right to a left hand plow for plowing on the sides of hills, and also for converting it into a cultivator for plowing between potatoes, corn, &c., as before described.

In testimony whereof I have hereunto signed my name, before two subscribing witnesses, this 14th day of January, 1848.

HAYWOOD COX.

Witnesses:
WM. P. ELLIOT,
A. E. H. JOHNSON.